United States Patent [19]

Nooren

[11] Patent Number: 5,684,125

[45] Date of Patent: Nov. 4, 1997

[54] METHOD AND DEVICE FOR PURIFYING LIQUID POLYSILOXANE MATERIAL AND ITS USE

[75] Inventor: Franciscus Petrus Marie Nooren, Stadskanaal, Netherlands

[73] Assignee: Bayer Aktiengesellschaft, Leverkusen, Germany

[21] Appl. No.: 428,073

[22] PCT Filed: Oct. 26, 1993

[86] PCT No.: PCT/NL93/00217

§ 371 Date: May 26, 1995

§ 102(e) Date: May 26, 1995

[87] PCT Pub. No.: WO94/10228

PCT Pub. Date: May 11, 1994

[30] Foreign Application Priority Data

Oct. 26, 1992 [NL] Netherlands ............... 9201854

[51] Int. Cl.⁶ .................................................. C08G 77/34
[52] U.S. Cl. .................. 528/483; 528/500; 528/502 F; 159/4.01; 159/4.04; 159/43.1; 159/13.2; 159/27.1; 159/27.4; 159/90; 202/236; 202/237
[58] Field of Search .................. 528/483, 500, 528/502 F; 159/4.01, 4.04, 43.1, 13.2, 27.1, 27.4, 901; 202/236, 237

[56] References Cited

U.S. PATENT DOCUMENTS

| | | | |
|---|---|---|---|
| 2,834,754 | 5/1958 | Hatch et al. | 528/483 |
| 3,086,243 | 4/1963 | Bergmeister et al. | |
| 3,926,927 | 12/1975 | Stookey. | |
| 4,017,355 | 4/1977 | Kiyota et al. | |
| 4,104,112 | 8/1978 | Stutz | 159/4.01 |
| 4,130,527 | 12/1978 | Miller et al. | |
| 4,282,348 | 8/1981 | Wada et al. | 159/4.04 |
| 4,356,116 | 10/1982 | Beers. | |
| 4,430,461 | 2/1984 | Deering et al. | |

FOREIGN PATENT DOCUMENTS 2 328 008  5/1977  France.

Primary Examiner—Melvyn I. Marquis
Attorney, Agent, or Firm—Sprung Kramer Schaefer & Briscoe

[57] ABSTRACT

The invention relates to a method for purifying liquid polysiloxane containing impurities as a low-molecular-weight fraction, by evaporating the low-molecular-weight fraction, in which method a liquid stream of impure liquid material in the form of a bundle of a multiplicity of streams or jets is brought into contact with a flowing gas phase, after which the gas stream, which contains the impurities, is removed and purified liquid material is collected; a device for performing this method and also the use of purified liquid material.

26 Claims, 1 Drawing Sheet

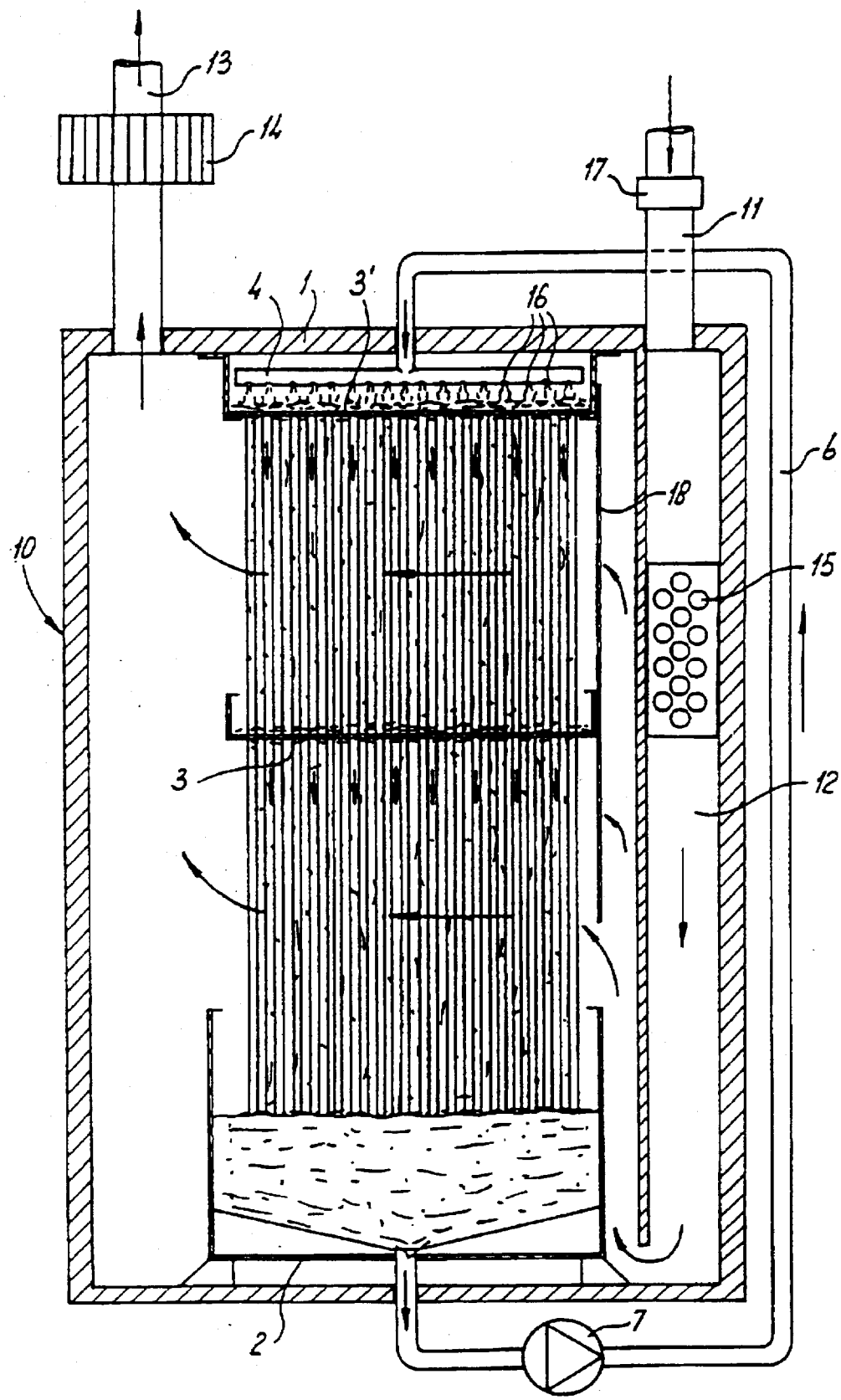

METHOD AND DEVICE FOR PURIFYING LIQUID POLYSILOXANE MATERIAL AND ITS USE

The invention relates to a method for purifying liquid polysiloxane containing impurities as a low-molecular-weight fraction, by evaporating the low-molecular-weight fraction.

Such a method for purifying polysiloxane is disclosed in U.S. Pat. No. 2,834,754. In that case, impure polysiloxane is kneaded at a temperature of 75°–175° C. in a mixer while gas ("stripping gas") is continuously fed to the kneaded material. This removes volatile constituents which are present in the polysiloxane as a result of the synthesis. However, this known method yields a product whose purity still leaves something to be desired, i.e. the purified product still contains too large an amount of low-molecular-weight constituents for certain applications.

U.S. Pat. No. 4,933,432 describes a method for reducing the amount of oligomeric siloxanes which are present as impurity in a polysiloxane, in which method the polysiloxane product is immersed in an organic liquid, in which liquid the oligomeric siloxanes are in fact soluble but not the polysiloxane, after which the immersed product is exposed to ultrasonic vibrations and the immersed product is then removed from the liquid. The polysiloxane product is a moulded product of so-called silicone rubber. In the introduction to the last-mentioned U.S. Patent Specification, applications of silicone-rubber products are mentioned, in which the problem of the undesirable effect of impurities originating from the synthesis of the polysiloxane may occur. In applications in electrical equipment, for example as sealing material in switchboxes, the problem occurs that low-molecular-weight components may evaporate during use or in the long term from the polysiloxane and deposit on components which should be electrically conducting. Although polysiloxane is an ideal sealing material per se, the phenomenon of the evaporation and redeposition of low-molecular-weight material on electrical components has a disadvantageous effect on the service life of the electrical device, for example a switch.

U.S. Pat. No. 4,356,116 discloses a method for devolatilizing polysiloxanes by heating this material at a temperature of at least 200° C. under vacuum for at least 5 minutes. This process yields a devolatilized room temperature silicone composition wherein the volatiles content does not exceed 0.003 g/cm$^3$.

U.S. Pat. No. 3,926,927 relates to a method for stripping unreacted monomers from a slurry of copolymerized acrylonitrile. According to the main claim this slurry should fulfil special conditions with respect to the solids content. The slurry is feeded downwardly through a treatment zone having a sequence of surfaces each having therein perforations through which the slurry can flow downward onto the next surface in the sequence. Steam is forced upward through the perforations in countercurrent flow to the slurry to strip unreacted monomers from that slurry. The flow rate of the steam is controlled in a special way. At a certain flow rate, the slurry will not flow downward through the perforations. This period takes 5–15 seconds. After this period, the steam flow is controlled in such a way that the slurry flows downward through the perforations. This period takes 1–10 seconds.

Polysiloxanes or silicones are synthetic organic silicon oxide compounds which are composed of the elements silicon, oxygen, carbon and hydrogen. They are used as lubricants, hydraulic liquids, agents for rendering water-repellant, varnishes and synthetic rubbers. Silicones are chemically inert and extremely stable at high temperatures. The synthesis of many linear and cyclic polysiloxanes by hydrolysis, polycondensation and polymerization is known from the prior art. Polysiloxanes are suitable for electrical applications and vacuum applications, and also for applications in the textile, paper, rubber and clothing industry. Because of the inert properties and the lack of toxicity, silicones are also used for medical purposes, for example, in dental laboratories (prostheses) and for surgical applications. A much used and generally known siloxane is polydimethylsiloxane (PDMS) which is a very stable compound. Although the application of silicones as rubber is limited because of the relatively high costs, its use is recommended in the aviation, space travel and automobile industry. Silicones have desired physical properties over a large temperature range, for example from −74° C. to 315° C.

It is known from the literature (cf. for example, the abovementioned U.S. Pat. No. 2,834,754) that polysiloxane oils, for example PDMS, may contain up to 10% by weight of volatile components (oligomers and the like) after their synthesis. These volatile constituents generally comprise cyclic compounds and oligomers of the monomer. The manufacturers supply their polysiloxane products with a maximum volatility of 0.5–2% by weight during 24 hours at 150° C.

So far there has been no success in finding an adequate method for removing impurities from polysiloxanes or silicone oils.

The object of the invention is to provide a solution to the problem indicated above, i.e. the purification of polysiloxane oils, that is silicones which also comprise so-called reactive silicone oils. Reactive silicones contain functional groups such as hydroxy groups.

It has been found that impurities can be removed completely, or virtually completely, in an efficient manner from liquid material of the abovementioned type in that a liquid stream of impure liquid material in the form of a bundle of a multiplicity of liquid filaments or jets is brought into contact with a flowing gas phase, after which the gas stream, which contains the impurities, is removed and purified liquid material is collected.

The liquid filaments or jets present in the method according to the invention also comprise liquid streams which can be formed, for example, by a slot or a narrow slit, in which case liquid curtains are produced. During the process of the invention the gas phase is preferably fed along the liquid filaments or jets in such a way that said filaments or jets come into contact with one another as little as possible. It has been found that, by using a small underpressure in the space where the contact takes place between liquid phase and gas phase, the thin filaments or jets remain parallel to one another and mutual contact of the liquid filaments or jets is therefore avoided.

The treatment by the method of the invention has the consequence that gas is absorbed in the liquid phase from the gas phase. During the purification of silicones, 1–20% of gas can be absorbed in the liquid phase. The liquid filaments or jets in which gas is absorbed have a white colour and fall as notional layers on top of one another. Purified material continues to float on unpurified material. As a result of this effect, material once purified is no longer contaminated with unpurified material, which has a higher density.

In the method according to the invention, the gas phase is preferably made to flow in a direction which is essentially parallel to that of the bundle of liquid filaments or jets. In this process, an intimate contact is obtained between gas phase and liquid phase. In particular, the countercurrent principle will be used in this process, i.e. the bundles of liquid filaments or jets are allowed to flow from top to bottom, while the gas stream is fed from bottom to top. It is, however, equally possible to use an inclined and/or transverse flow, but care should, however, be taken that the liquid filaments or jets do not come into contact, or come into contact as little as possible, with one another in order to guarantee the efficiency of the purification.

According to a preferred embodiment of the method of the invention, use is made of a perforated plate or screen, through which a liquid material is allowed to flow downwards to form a bundle of a multiplicity of liquid filaments or jets. An example of a suitable arrangement of a perforated plate or screen in a device according to the invention and various possible embodiments of such a device and the components thereof is described below. The method according to the invention is, however, certainly not restricted to the use of such a specific device.

In the method according to the invention in which a perforated plate or screen is used, there are generally 10–1000 openings/dm$^2$ in the plate or screen. At the same time, the viscosity of the liquid material is 5–1,000,000 centistokes. It is obvious that, to increase the surface of the liquid, a bundle of as many as possible independent liquid filaments is preferably desired. It has been found that a screen having, for example, 100–400 openings per dm$^2$, in particular 200 openings/dm$^2$, appears to be quite satisfactory with a viscosity of 5–300,000. For higher viscosities, i.e. of 3000–1,000,000 centistokes, a lower number of holes will be used.

In the method according to the invention in which a perforated plate or screen is used, the filament diameters eventually all acquire the same values again, generally in the range between 0.1 mm and 0.4 mm, depending on the viscosity. It has been found that the mutual spacing of the filaments (centre-to-centre) must be not less than 7 mm in order not to touch one another while falling. Guidelines for the diameters of the holes in the perforated plate or screen in relation to the viscosity of the liquid material can be obtained from the following table:

| Viscosity of liquid material (centistokes) | Diameter of the holes (mm) |
| --- | --- |
| 5–100 | 0.5–1.5 |
| 100–1000 | 1.0–2.5 |
| 1000–5000 | 2.0–3.5 |
| 5000–300,000 | 3.0–5.5 |
| 300,000–600,000 | 5.0–7.5 |
| 600,000–1,000,000 | 7.5–12.0 |

It is pointed out that, in the method according to the invention, in which a perforated plate or screen is used, at least some of the liquid stream, i.e. the uppermost part thereof, is in the form of tapering filaments. This means that the diameter at the top, i.e. directly underneath the perforated plate or screen, is greater than the diameter further downstream in the bundle of the liquid filaments. Thus, the diameter of the jet may be on average 0.03–5 mm, the jet being, for example, 2–5 mm at the top and, for example, 0.03–0.4 mm further down, i.e. for example, 10 cm downstream.

The length of the bundle of flowing liquid filaments is preferably at least 10 cm, preferably at least 40 cm, in particular 50–70 cm. The length of the liquid filaments is dependent on the temperature used, the viscosity and the diameter of the filaments.

According to the invention, it is possible to make use of perforated plates or screens placed one above the other, in which case, as a result of the cascade-like arrangement, bundles of liquid filaments flowing from top to bottom reaching a collecting tank or reservoir for purified polysiloxane via one or more additional perforated plates or screens.

The duration of the purification treatment is generally 1–100 hours, in particular 3–40 hours, depending on the temperature, viscosity and the diameter of the liquid filaments or holes in the perforated plates. The purification time can be reduced by increasing the number of perforated plates. If the required purification time is 10 hours with, for example, 2 screens, the purification time is 5 hours if 4 screens are used, for example at a mutual spacing of 50 cm. An important part of the treatment time can be ascribed to the heating-up time of the liquid material to be purified, which may be as much as 1–3 hours.

According to a preferred embodiment of the method according to the invention, the liquid stream is recirculated, with the result that bundles of a multiplicity of liquid filaments or jets are formed again each time from the same charge (batch). As a result of such a treatment, a high degree of purification of the polysiloxane can be achieved. The gas phase, which entrains the volatile impurities, is removed and discharged into the atmosphere via a condenser, in which the volatile components are precipitated as liquid. It is, however, also possible to recirculate the gas phase, preferably after precipitating the entrained volatile components. The method according to the invention can therefore be carried out with a closed liquid and/or gas circulation system. In this connection, the phenomenon described above relating to the gas absorption in the liquid material to be purified is important. The purified material always remains, after all, on the less pure, already treated material and sinks downwards in such a manner that no mixing of material which has undergone one purification stage less occurs.

BRIEF DESCRIPTION OF THE INVENTION

In the method according to the invention, the liquid stream may have a temperature of 0°–300° C., preferably 50°–200° C. Of course, the viscosity of the starting material can be reduced by increasing its temperature. It has also been found that the evaporation of the low-molecular-weight fraction takes place more efficiently if the liquid is at an elevated temperature, for example in the already mentioned range, for example in the range of 100°–150° C.

In the method according to the invention, the gas phase is generally at a temperature of 10°–300° C., preferably 50°–200° C. There is, of course, always a heat exchange between gas phase and liquid stream, i.e. it is possible to start, for example, with a gas stream at ambient temperature which is fed along a heated stream of polysiloxane, in which process the gas stream is heated to the temperature of the liquid stream as a maximum. The reverse is also possible: a heated gas stream heats a colder liquid stream.

As has already been stated, a slight underpressure for example, of 4.9–14.7 kPa (0.05–0.15 atmosphere) prevails in the space where the treatment according to the invention is carried out. This underpressure can be effected by sucking off gas from the treatment space. The gas phase may be composed of air or inert gas. Because of the low costs, nitrogen is very suitable. In the case of the purification of silicones, it is particularly preferable to use carbon dioxide because this gas dissolves well in the material to be purified. Carbon dioxide dissolves approximately 10 times better than air in silicones. Obviously, it is undesirable for the gas phase to react with the material to be purified, which would impair the purity of the material.

BRIEF DESCRIPTION OF THE DRAWING

The invention furthermore relates to a device for purifying liquid material, comprising a container having a reservoir, open at the top, at the bottom, at least one perforated plate or screen which is oriented essentially in the horizontal plane and which is disposed above the reservoir, and distributing means for feeding liquid material onto, and distributing it over, the uppermost perforated plate or screen.

The same specifications as have already been stated above in the case of the method of the invention apply with respect to the perforated plate or screen, i.e. the specifications relating to the number of openings and the diameter thereof. The openings in the perforated plate may therefore also be present as slots or slits.

The device according to the invention, which is eminently suitable for purifying polysiloxane, generally contains 1–10, preferably 2–5 perforated plates, the mutual spacing of the plates preferably being at least 40 cm.

According to a preferred embodiment of the invention, the distributing means for supplying and distributing liquid material comprises a distributing tube disposed above the uppermost plate and essentially parallel thereto, which distributing tube comprises one or more outlet openings disposed in its longitudinal direction. By means of such a tube, liquid material to be purified can be efficiently supplied and distributed over the uppermost plate.

According to a further embodiment, a second tube is disposed around the distributing tube, in which openings corresponding to the outlet opening(s) of the distributing tube are disposed, the second tube being rotatable with respect to the distributing tube. As a result of this rotation of the second tube, the supply of material to be purified is controllable.

In the method or device according to the invention it is important that uniform liquid filaments running parallel to one another are formed. For this purpose, the openings in the perforated plate or screen may be provided with special means. Thus, in the device according to the invention, the edges of the perforations in the plate or screen may be folded downwards. These are therefore "countersunk" perforations. A further way of optimizing the device is to provide pins which taper downwards and which project through the perforations of the plate or screen from above.

The device according to the invention furthermore preferably comprises recirculation means which remove the liquid material from the reservoir at the bottom of the container via, for example, a pump and pipe means and feed it to the distributing means above the uppermost perforated plate or screen.

The device according to the invention may also comprise feed and removal means for feeding the gas phase into the container or removing it therefrom, respectively. Said feed and removal means for the gas phase comprise, according to a particular embodiment, means for effecting or maintaining an underpressure in the container, as may be desirable in the above-described method according to the invention. If, for example, the gas phase is drawn off at the top of the device, a slight underpressure, for example of 4.9–14.7 kPa (0.05–0.15 atmosphere), is automatically produced in the container.

According to a preferred embodiment of the device according to the invention, the feed means for the gas phase are constructed in such a way that they feed the gas phase near the reservoir, i.e. at the bottom of the device where the reservoir is situated, while the removal means for the gas phase are situated near the uppermost perforated plate or screen, which is at the top of the device.

The device according to the invention may furthermore comprise recirculation means for recirculating the gas phase through the container.

The device according to the invention also comprises, in particular, precipitation means for the gas phase which serve to precipitate from the gas phase impurities originating from the liquid material. Said precipitation means may be present in the removal means and/or further recirculation means.

Because the method according to the invention is preferably carried out at elevated temperature, heating means are also preferably present in the device according to the invention for heating the gas phase and/or the liquid phase. Said heating means may comprise a conventional heat exchanger, for example a heating coil. Other heating means may also be used, for example devices for generating high-energy radiation such as that used in a magnetron.

According to a preferred embodiment, the device according to the invention comprises feed means for the gas phase in the form of a perforated feed plate which is fitted in the vertical direction along the space between the uppermost perforated plate or screen and the reservoir. Although such a perforated feed plate may extend over the entire space between the uppermost perforated plate or screen and the reservoir, it is desirable that more gas is fed to the bottom so that the plate at the bottom has larger openings or is even not present at the bottom.

On either side of the space in which the liquid filaments or jets flow, i.e. parallel thereto, optionally detachable perforated plates may be fitted which determine the flow direction of the gas phase. Thus, by correctly arranging such perforated plates, it is possible to control the gas flow in such a way that it is transverse to the flow direction of the liquid filaments. The feed means for the gas phase may comprise a filter, for example a zeolite or carbon filter.

It is possible to operate the device according to the invention continuously, one or more optionally identical apparatuses being used.

BRIEF DESCRIPTION OF THE DRAWING

The invention is explained by reference to the FIGURE, in which the device for purifying liquid polysiloxane, is denoted by 10, which device comprises a container 1 having a reservoir 2, open at the top, at the bottom, perforated plates 3, 3' in the horizontal plane, which planes are disposed above the reservoir, and distributing means or feed means for feeding liquid material onto, or distributing it over, the uppermost perforated plate or screen 3'.

During the operation of the device, liquid material is fed from the bottom of the reservoir via pipe 6 and pump 7 to the top of the device and, via distributing tube 4 having openings 16 therein, is fed or distributed over the uppermost perforated plate 3'. The bundle of a multiplicity of liquid filaments or jets is formed directly underneath the perforated plate 3' and falls onto the likewise perforated plate 3, where a bundle of a multiplicity of liquid filaments or jets again forms and is fed into the open reservoir 2.

In the device shown in the FIGURE, gas, for example air, is drawn in via feed pipe 11, which contains a purifying filter 17. The gas stream is heated with the aid of a heating coil 15. After the gas stream has passed along the liquid stream, it is drawn off with the aid of means 13, which are not shown, impurities removed from the polysiloxane being precipitated from the gas phase by the precipitator 14. The desired gas distribution through the liquid stream is effected with the aid of a perforated plate 18 which is fitted in the vertical direction along the space between the uppermost perforated plate 3' and the reservoir 2. As has already been stated above, the perforated plates 18 ensure a uniform flow through the filaments. The plates 18 also have the function of being able to hold back the liquid phase if the liquid filaments unexpectedly "deflect" as a result of an (uncontrolled) gas stream.

The invention also relates to the use of polysiloxanes which can be obtained using the method or the device of the invention. For the possible applications, reference is made to the prior art, which has been described above.

In particular, the invention relates to the use of polysiloxane for insulation or sealing purposes, for example for insulating electrical contacts. A good example is the insulation in cable couplings, such as that described in EP 0 421 246 A2, EP 0 421 254 A2 and EP 0 421 253 A2. In this case, the use of the polysiloxane preferably takes place in the form of a paste which contains inorganic fillers in addition to the purified polysiloxane.

The polysiloxanes, for example PDMS, obtained using the method or device of the invention and having, for example, a viscosity of 5000, 60,000 or 1,000,000 centistokes has excellent insulating properties for electrical application. The siloxanes obtained according to the invention have a low "bleeding" and provide stable products. No contamination as a result of evaporation and condensation of oligomers on electrical contacts takes place. Such properties are of great importance of photocopying apparatuses, in the breaking of emulsions and in the electronic and computer industry. Inert products are also desirable in the field of the food industry.

Telecommunication organizations require polysiloxanes which exhibit very little bleeding when used in electrical or electronic equipment. It has been found that the products produced according to the invention, for example pastes based on polysiloxanes purified according to the invention, have excellent properties according to the test specification "Kontaktschädigende Ausscheidungen in Fernmelde-Einrichtungen" ("Contact-damaging deposits in telecommunication devices"), FTZ 547 PV 1, German Federal Post Office, Darmstadt, Germany.

Moreover, silicones in very pure form are desirable for surgical applications, for example in heart or vein (artery) operations.

The following test specification is used to compare the quality of the silicone oil before and after the purification. Test specification for the purification of polysiloxanes (PDMS having a viscosity of 100–1,000,000 centistokes).

An infrared spectrum is taken of the PDMS before and after the purification. It will often appear that the spectrum after the purification does not deviate to an appreciable extent from the spectrum of the original product. This means that no decomposition, reduction or oxidation of the polysiloxane is detected during the treatment according to the invention, which leads to the conclusion that the general properties of the PDMS remain unchanged.

The volatility of the material is determined as follows:
—weigh out 2 g of the material into a small dish having a diameter of 6 cm and a height of 1 cm;
—heat the sample in the small dish for 24 hours at 150° C. in an oven;
—cool and weigh the dish containing the sample again;
—calculate the loss in weight on the basis of the original weight of the sample.

Commercially available PDMS exhibits a weight loss of 0.5–2.5% by weight in the above test.

The method and device according to the invention improve the volatility of the polysiloxane material, in particular PDMS appreciably, to a level of 0.05–0.001% by weight, depending on the circumstances and duration of the treatment, in particular the temperature.

Furthermore, reactive silicones containing functional groups have been purified in accordance with the method of the invention.

Such a silicone material having a viscosity of 50,000 centistokes and containing 1.49% of volatile components was purified. The results are as follows:
after 3 h at 150° C.: 0.23%
after 24 h at 150° C.: 0.0099%
after 2 days at 150° C.: 0.0000%.

Another silicone material of a similar type but obtained from another producer was purified. The starting material contained 2.20% of volatile components. After 25 hours at 150° C. the volatility was 0.1%.

The present invention also relates to all types of polysiloxanes such as PDMS and reactive polysiloxanes having a maximum volatility of 0.1%, e.g. 0.05 or even 0.0001%, wherein the volatility is defined as in the above. Such pure polysiloxanes are in fact novel materials.

It has been found that material according to the invention has virtually no adverse effect on the contact resistance of switching connections according to the abovementioned test specification of the German Federal Post Office. The measured resistance after, for example, 2 to 3 million switchings remains far below the limit which is mentioned in the test specification. Unpurified silicones have a very strong adverse effect on the contact resistance. Even after 50,000 switchings, the electrical contacts are contaminated with material originating from the unpurified polysiloxane oil.

I claim:

1. A method for removing low molecular weight components from liquid polysiloxane through evaporation, which comprises forming the liquid polysiloxane into a bundle of multiple liquid streams, and contacting said multiple liquid streams of polysiloxane with a flowing gas stream, whereby low molecular weight components present in said liquid polysiloxane are removed from said liquid polysiloxane by said gas stream.

2. Method according to claim 1, wherein the gas phase is made to flow in a direction which is essentially parallel to that of the bundle of liquid streams.

3. Method according to claim 1, wherein the liquid stream and the gas phase are fed essentially in countercurrent to one another.

4. Method according to claim 1, wherein liquid polysiloxane is allowed to flow downwards through a perforated plate or screen to form said bundle of multiple liquid streams.

5. Method according to claim 4, wherein a perforated plate having 10–1000 openings per $dm^2$ is used and the diameter of the openings is 0.1–20 mm.

6. Method according to claim 1, wherein the flowing liquid streams have a length of at least 40 cm, and an average diameter of 0.03–5 mm.

7. Method according to claim 1, wherein at least some of the liquid stream is in the form of tapering streams.

8. The method of claim 1, wherein said multiple liquid streams are at a temperature of 0°–300° C., have diameters of from 0.1 to 0.4 mm and are separated from each other by at least 7 mm, center to center.

9. Method according to claim 8, wherein the gas phase is at a temperature of 10°–300° C., the duration of the purification treatment is 1–100 hours, and the gas phase is kept under a pressure of 0.8 atm to 1 atm.

10. Method according to claim 1, wherein said gas is air, nitrogen or carbon dioxide.

11. Method according to claim 1, wherein the liquid streams and/or the gas streams recirculate.

12. Device for purifying liquid polysiloxane, comprising a container having a reservoir, open at the top and at the bottom, at least one perforated plate or screen which is oriented essentially in the horizontal plane and which is disposed above the reservoir, and distributing means for feeding liquid material onto, and distributing it over, the uppermost perforated plate or screen and through which gas can be passed horizontally.

13. Device according to claim 12, wherein the distributing means comprise a distributing tube disposed above the uppermost plate and parallel thereto, which distributing tube comprises one or more outlet openings disposed in the longitudinal direction thereof.

14. Device according to claim 12, containing a second tube in which openings corresponding to the outlet opening(s) of the distributing tube are disposed, and wherein the second tube is rotatable with respect to the distributing tube.

15. Device according to claim 12, wherein the edges of the perforations in the plate or stream are folded downwards.

16. Device according to claim 12, wherein pins which taper downwards project through the perforations from above.

17. Device according to claim 12, wherein the perforated plate or screen comprises 10–1000 openings per $dm^2$ which have a diameter of 0.1–20 mm.

18. Device according to claim 12, comprising recirculating means which remove the liquid material from the reservoir via a pump and pipe means and feed it to the distributing means.

19. Device according to claim 12, comprising feed and removal means for feeding the gas phase into the container or removing it therefrom, respectively.

20. Device according to claim 19, wherein the feed and removal means for the gas phase comprise means for effecting or maintaining an underpressure in the container.

21. Device according to claim 19, wherein the feed means feed the gas phase near the reservoir and the removal means for the gas phase remove the latter from the container at the uppermost perforated plate or screen.

22. Device according to claim 19, comprising further recirculating means, for recirculating the gas phase through the container.

23. Device according to claim 19, wherein the removal means and/or further recirculating means for the gas phase comprise precipitation means for precipitating impurities from the gas phase.

24. Device according to claim 12, comprising heating means for the gas phase and/or the polymeric material.

25. Device according to claim 12, wherein the feed means for the gas phase comprise a filter.

26. Device according to claim 12, wherein the feed means for the gas phase comprise a perforated feed plate which is disposed in the vertical direction along the space between the uppermost perforated plate or screen and the reservoir.

* * * * *

UNITED STATES PATENT AND TRADEMARK OFFICE
CERTIFICATE OF CORRECTION

PATENT NO. : 5,684,125
DATED : November 4, 1997
INVENTOR(S) : Nooren, Franciscus Petrus Marie It is certified that error appears in the above-indentified patent and that said Letters Patent is hereby corrected as shown below:

Col. 10, line 14    Delete " near " and substitute -- towards --

Signed and Sealed this

Twenty-first Day of July, 1998

Attest:

BRUCE LEHMAN

*Attesting Officer*      Commissioner of Patents and Trademarks